US012470982B2

(12) United States Patent
Wang et al.

(10) Patent No.: US 12,470,982 B2
(45) Date of Patent: Nov. 11, 2025

(54) DATA TRANSMISSION METHOD AND APPARATUS

(71) Applicant: HUAWEI TECHNOLOGIES CO., LTD., Guangdong (CN)

(72) Inventors: Lei Wang, Shanghai (CN); Lei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 485 days.

(21) Appl. No.: 18/166,093

(22) Filed: Feb. 8, 2023

(65) Prior Publication Data

US 2023/0189070 A1    Jun. 15, 2023

Related U.S. Application Data

(63) Continuation of application No. PCT/CN2021/111610, filed on Aug. 9, 2021.

(30) Foreign Application Priority Data

Aug. 10, 2020 (CN) .......................... 202010797944.1

(51) Int. Cl.
H04W 28/06 (2009.01)
(52) U.S. Cl.
CPC .................. H04W 28/065 (2013.01)
(58) Field of Classification Search
None
See application file for complete search history.

(56) References Cited

U.S. PATENT DOCUMENTS

2019/0044571 A1* 2/2019 Taherzadeh Boroujeni ................ H04B 1/707
2022/0149987 A1* 5/2022 Peng ..................... H04L 1/0013

FOREIGN PATENT DOCUMENTS

CN      105610480 A      5/2016

OTHER PUBLICATIONS

International Search Report and Written Opinion in International Appln. No. PCT/CN2021/111610, mailed on Oct. 28, 2021, 15 pages (with English Translation).

* cited by examiner

Primary Examiner — Diane L Lo
(74) Attorney, Agent, or Firm — Fish & Richardson P.C.

(57) ABSTRACT

This application provides a data transmission method and an apparatus. In an example method, a first sequence and a common sequence group are obtained, where a quantity of sequences in the common sequence group is N; the first sequence includes K first sub-sequences, lengths of the K first sub-sequences are sequentially $B_1, B_2, \ldots, B_K$, K is a positive integer, $B_1 = \log_2 N$, and the length $B_1$ of a $1^{st}$ first sub-sequence is greater than or equal to a length of another first sub-sequence. The K first sub-sequences are separately mapped into K second sub-sequences based on the common sequence group. A second sequence including the K second sub-sequences is output.

20 Claims, 4 Drawing Sheets

DATA TRANSMISSION METHOD AND APPARATUS

CROSS-REFERENCE TO RELATED APPLICATIONS

This application is a continuation of International Application number PCT/CN2021/111610, filed on Aug. 9, 2021, which claims priority to Chinese Patent Application No. 202010797944.1, filed on Aug. 10, 2020. The disclosures of aforementioned applications are hereby incorporated by reference in their entireties.

TECHNICAL FIELD

Embodiments of the present invention relate to the communications field, and specifically, to a data transmission method and an apparatus.

BACKGROUND

The new radio (NR) technology covers three application scenarios: enhanced mobile broadband (eMBB), massive machine type communications (mMTC), and ultra-reliable and low latency communications (URLLC). The mMTC supports communication of a large quantity of machine types. In an mMTC scenario, there are a large quantity of potential to-be-accessed users in a cell, and these users may be terminal devices in various forms. In this scenario, a data packet sent by a user each time is small. However, because there are a large quantity of users, there is a great challenge to access performance and data transmission performance of a network.

SUMMARY

Embodiments of this application provide a data transmission method and an apparatus, to improve data transmission accuracy in a scenario in which a large quantity of users transmit small packets.

According to a first aspect, a data transmission method is provided. The method includes: obtaining a first sequence and a common sequence group, where a quantity of sequences in the common sequence group is N; the first sequence includes K first sub-sequences, lengths of the K first sub-sequences are sequentially $B_1, B_2, \ldots, B_K$, K is a positive integer, $B_1 = \log_2 N$, and the length $B_1$ of a $1^{st}$ first sub-sequence is greater than or equal to a length of another first sub-sequence; separately mapping the K first sub-sequences into K second sub-sequences based on the common sequence group, and outputting a second sequence, where the second sequence includes the K second sub-sequences.

The common sequence group may be a sequence group agreed on by a receive end and a transmit end, or may be a group specified in a protocol. A length of each sequence in the K first sub-sequences is also agreed on in advance by the receive end and the transmit end, and a length of a $1^{st}$ first sub-sequence is related to a quantity of sequences in the common sequence group.

According to the data transmission method provided in the first aspect of this application, to-be-sent data is divided into a plurality of first sub-sequences, and the plurality of first sub-sequences are mapped into second sub-sequences based on the common sequence group for transmission, so that transmission of small packets of data for a large quantity of users can be supported. Compared with a conventional manner of transmitting data by using pilot, in the technical solution provided in this application, no pilot needs to be transmitted, and the receive end may perform receiving in a sensing compression manner, thereby improving transmission efficiency.

In a possible implementation, all or a part of the K first sub-sequences include a check bit. The transmit end and the receive end agree on a manner of setting a check bit and a manner of calculating a check value, so that the receive end successfully performs check after receiving a signal. In this implementation in which the check bit is included, data transmission reliability can be further enhanced.

In a possible implementation, the separately mapping the K first sub-sequences into K second sub-sequences based on the common sequence group includes: selecting, from the common sequence group based on values of $1^{st}$ to $n^{th}$ first sub-sequences, an $n^{th}$ second sub-sequence corresponding to the $n^{th}$ first sub-sequence, where $n \in [2, K]$.

A unique sequence is selected from the preset common sequence group as the $n^{th}$ second sub-sequence based on the values of $1^{st}$ to $(n-1)^{th}$ first sub-sequences and the value of the $n^{th}$ first sub-sequence, to map the K first sub-sequences into the K second sub-sequences. Therefore, after receiving the second sub-sequence, the receive end determines a value of the first sub-sequence based on a location of the second sub-sequence in the common group, and then restores the first sub-sequence.

In a possible implementation, the $n^{th}$ first sub-sequence corresponds to an $n^{th}$ sequence subgroup that includes $2^{\hat{}}B_n$ sequences in the common sequence group, the $n^{th}$ second sub-sequence is a sequence in the $n^{th}$ sequence subgroup, the $n^{th}$ sequence subgroup is determined based on values of the $1^{st}$ to $(n-1)^{th}$ first sub-sequences, and the $n^{th}$ second sub-sequence is selected from the $n^{th}$ sequence subgroup based on the value of the $n^{th}$ first sub-sequence.

A sequence subgroup corresponding to the $n^{th}$ first sub-sequence is determined from the common sequence group based on values of first $n-1$ first sub-sequences, and then the $n^{th}$ second sub-sequence is determined from the sequence subgroup based on the value of the $n^{th}$ first sub-sequence. In other words, selection of the $2^{nd}$ second sub-sequence is related to the value of a $1^{st}$ first sub-sequence, selection of the $3^{rd}$ second sub-sequence is related to values of $1^{st}$ and $2^{nd}$ first sub-sequences, and the like. In this mapping manner, data transmission reliability can be ensured without adding a check bit.

In a possible implementation, the $n^{th}$ second sub-sequence is selected from an $n^{th}$ sequence subgroup based on a value of the $n^{th}$ first sub-sequence, and the $n^{th}$ sequence subgroup is obtained by sequentially sorting $f(0)^{th}, f(1)^{th}, \ldots, f(2^{\hat{}}(B_n)-1)^{th}$ sequences in the common sequence group. $f(\ )$ meets $f(c(i)) = c(\mathrm{mod}((i+1), N))$, $c(i) = \mathrm{mod}(b*i*(i+1)/2, N)$, and $i = 0, 1, \ldots, N-1$; $b = \mathrm{mod}(a, N/2)*2+1$, where a parameter a is determined based on values of $1^{st}$ to $(n-1)^{th}$ first sub-sequences.

The parameter a may be a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

The $n^{th}$ first sub-sequence corresponds to $f(0)^{th}, f(1)^{th}, f(2^{\hat{}}(B_n)-1)^{th}$ sequences in the common sequence group. That is, the $n^{th}$ sequence subgroup is obtained by sequentially sorting $f(0)^{th}, f(1)^{th}, \ldots, f(2^{\hat{}}(B_n)-1)^{th}$ sequences in the common sequence group. The parameter a is determined based on values of $1^{st}$ to $(n-1)^{th}$ first sub-sequences, and the $n^{th}$ sequence subgroup including $2^{\wedge}(B_n)$ sequences is determined based on the parameter a after a series of calculations.

The value of the $n^{th}$ first sub-sequence is equal to a sequence number or an index number of the $n^{th}$ second sub-sequence in the sequence subgroup. For example, when the value of the $n^{th}$ first sub-sequence is 2, the $f(2)^{th}$ sequence in the common sequence group is the corresponding $n^{th}$ second sub-sequence.

This implementation provides a specific manner of mapping the first sub-sequence into the second sub-sequence.

In a possible implementation, the $n^{th}$ second sub-sequence is selected from the $n^{th}$ sequence subgroup based on the value of the $n^{th}$ first sub-sequence.

The $n^{th}$ sequence subgroup is obtained by sequentially sorting $mod(a+i, N)^{th}$ sequences in the common sequence group, where $i=0, 1, \ldots, 2^{\wedge}(B_n)-1$, N is a quantity of sequences in the common sequence group, and a parameter a is determined based on values of the $1^{st}$ to $(n-1)^{th}$ first sub-sequences.

The parameter a may be a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

The $n^{th}$ sequence subgroup is obtained by sequentially sorting $mod(a+i, N)^{th}$ sequences in the common sequence group, the parameter a is determined based on the values of the $1^{st}$ to $(n-1)^{th}$ first sub-sequences, and then the $n^{th}$ sequence subgroup including $2^{\wedge}(B_n)$ sequences is determined based on $mod(a+i, N)$.

The value of the $n^{th}$ first sub-sequence is equal to a sequence number or an index number of the $n^{th}$ second sub-sequence in the sequence subgroup. For example, when the value of the $n^{th}$ first sub-sequence is 3, the $mod(a+3, N)^{th}$ sequence in the common sequence group is the corresponding $n^{th}$ second sub-sequence.

This implementation provides another specific manner of mapping the first sub-sequence into the second sub-sequence, and calculation complexity of this manner is low.

In a possible implementation, the $n^{th}$ second sub-sequence is selected from the $n^{th}$ sequence subgroup based on the value of the $n^{th}$ first sub-sequence.

The $n^{th}$ sequence subgroup is obtained by sequentially sorting $f(0)^{th}, f(1)^{th}, \ldots, f(2^{\wedge}(B_n)-1)^{th})$ sequences in the common sequence group; and f( ) meets $f(i)=mod(((1-a^{\wedge}i)*b)/(1-a), N)$, $i=0, 2, \ldots, N-1$, and a parameter a and a parameter b are determined based on values of the $1^{st}$ to $(n-1)^{th}$ first sub-sequences.

The parameter a may be a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences. The parameter b may be a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

The $n^{th}$ sequence subgroup is obtained by sequentially sorting $mod(((1-a^{\wedge}i)*b)/(1-a), N)^{th}$ sequences in the common sequence group. The parameter a and the parameter b are determined based on values of the $1^{st}$ to $(n-1)^{th}$ first sub-sequences, and then the $n^{th}$ sequence subgroup including $2^{\wedge}(B_n)$ sequences is determined based on $mod(((1-a^{\wedge}i)*b)/(1-a), N)$.

The value of the $n^{th}$ first sub-sequence is equal to a sequence number or an index number of the $n^{th}$ second sub-sequence in the sequence subgroup. For example, when the value of the $n^{th}$ first sub-sequence is 3, the $mod(((1-a^{\wedge}3)*b)/(1-a), N)^{th}$ sequence in the common sequence group is the corresponding $n^{th}$ second sub-sequence.

This implementation provides another specific manner of mapping the first sub-sequence into the second sub-sequence.

In a possible implementation, before the second sequence is output, some of the K second sub-sequences are truncated, that is, a part of the output K second sub-sequences are truncated sequences. A truncation manner, for example, a quantity and sequence numbers of the truncated second sub-sequences, and lengths of the truncated sequences, is agreed on by the transmit end and the receive end in advance based on an actual communication status, or is specified in a protocol.

In this possible implementation, a length of data transmitted each time is shortened compared with that of data not being truncated, so that a transmission delay can be reduced, and transmission efficiency can be improved.

According to a second aspect, a data transmission method is provided. The method includes: receiving a second sequence, where the second sequence includes K second sub-sequences; separately mapping the K second sub-sequences into K first sub-sequences based on a common sequence group; and determining a first sequence based on the K first sub-sequences.

The common sequence group may be a sequence group agreed on by a transmit end and a receive end, or may be a group specified in a protocol. A length of each sequence in the K first sub-sequences is also agreed on in advance by the transmit end and the receive end.

In the data transmission method provided in the second aspect of this application, the second sequence including a plurality of second sub-sequences is obtained, and the plurality of second sub-sequences are restored into corresponding first sub-sequences based on the preset common sequence group, so that a transmission manner in which a large quantity of users transmit small packets of data can be supported.

In a possible implementation, the separately mapping the K second sub-sequences into K first sub-sequences based on a common sequence group includes: detecting the K second sub-sequences based on the common sequence group, to separately determine values of the K first sub-sequences; and determining the K first sub-sequences based on the values of the K first sub-sequences.

Specifically, correlation detection is performed based on the common sequence group to sequentially determine the values of the K first sub-sequences. A length of each of the K first sub-sequences is agreed on in advance by the receive end and the transmit end, and a value of each bit may be determined based on a value of each first sub-sequence and a length of the first sub-sequence, to determine each first sub-sequence.

In a possible implementation, the $1^{st}$ second sub-sequence is detected based on the common sequence group, to determine the value of the $1^{st}$ first sub-sequence; a sequence subgroup corresponding to the $2^{nd}$ second sub-sequence is determined based on the value of the $1^{st}$ first sub-sequence and the common sequence group; and the $2^{nd}$ second sub-sequence is detected based on the sequence subgroup corresponding to the second sub-sequence, to determine a value of the $2^{nd}$ first sub-sequence.

It should be noted that the detection may be correlation detection.

A quantity N of sequences in the common sequence group=$2^{\wedge}B_1$, where $B_1$ is a length of the $1^{st}$ first sub-sequence. A value of the $1^{st}$ first sub-sequence corresponds to a sequence number or an index value of a sequence in the common sequence group. The $1^{st}$ second sub-sequence is detected based on the common sequence group, where a sequence number of a sequence that is in the common sequence group and that is most correlated with the $1^{st}$ second sub-sequence is the value of the first sub-sequence.

In a manner at the transmit end, a second sequence subgroup corresponding to the $2^{nd}$ second sub-sequence is determined based on the value of the $1^{st}$ first sub-sequence and the common sequence group, where the sequence subgroup includes $2^{\wedge}B_1$ sequences in the common sequence group.

The $2^{nd}$ second sub-sequence is detected based on a second sequence subgroup, where a value of a sequence that is in the sequence subgroup and that is most correlated with the $2^{nd}$ second sub-sequence is the value of the $2^{nd}$ first sub-sequence.

In a possible implementation, an $n^{th}$ sequence subgroup corresponding to an $n^{th}$ second sub-sequence is determined based on values of $1^{st}$ to $(n-1)^{th}$ first sub-sequences and the common sequence group, where $n \in [2, K]$. The $n^{th}$ second sub-sequence is detected based on the $n^{th}$ sequence subgroup, and the value of the $n^{th}$ first sub-sequence is determined.

Specifically, in the manner at the transmit end, the $n^{th}$ sequence subgroup corresponding to the $n^{th}$ second sub-sequence is determined based on the values of the $1^{st}$ to $(n-1)^{th}$ first sub-sequences and the common sequence group, where the sequence subgroup includes $2^{\wedge}B_n$ sequences in the common sequence group.

For a method for determining, based on the values of the $1^{st}$ to $(n-1)^{th}$ first sub-sequences and the common sequence group, the $n^{th}$ sequence subgroup corresponding to the $n^{th}$ second sub-sequence, refer to various possible implementations in the first aspect. Details are not described herein again.

The $n^{th}$ second sub-sequence is detected based on the $n^{th}$ sequence subgroup, where a value of a sequence that is in the sequence subgroup and that is most correlated with the $n^{th}$ second sub-sequence is the value of the $n^{th}$ first sub-sequence.

In a possible implementation, when the $n^{th}$ second sub-sequence is a truncated sequence, the $n^{th}$ sequence subgroup is truncated in an agreed truncation manner, and a correlation of the $n^{th}$ second sub-sequence is detected based on the truncated sequence subgroup, to determine a sequence number of a sequence with a highest correlation in the truncated $n^{th}$ sequence subgroup, where the value of the $n^{th}$ first sub-sequence is equal to the sequence number. In this implementation, a transmission delay can be reduced, and transmission efficiency is improved.

In a possible implementation, when all or a part of the K first sub-sequences include a check bit, check is performed in a check manner agreed on by the receive end and the transmit end, and after check succeeds, the first sequence is restored. In this implementation, data transmission reliability can be further improved.

According to a third aspect, this application provides a communication apparatus. The communication apparatus may be configured to perform the method in the first aspect. The communication apparatus may be a terminal device or a network device, or may be an apparatus (for example, a chip, a chip system, or a circuit) in a terminal device or a network device, or may be an apparatus that can be used together with a terminal device or a network device. In a possible implementation, the communication apparatus may include modules or units that one to one correspond to the methods/operations/steps/actions described in the first aspect. The modules or units may be hardware circuits, software, or may be implemented by a hardware circuit in combination with software. In a possible implementation, the communication apparatus may include a processing unit and a transceiver unit. The processing unit may be configured to invoke the transceiver unit to perform receiving and/or sending functions. For example, the processing unit is configured to obtain a first sequence and a common sequence group, where a quantity of sequences in the common sequence group is N; the first sequence includes K first sub-sequences, lengths of the K first sub-sequences are sequentially $B_1, B_2, \ldots, B_K$, K is a positive integer, $B_1 = \log_2 N$, and the length $B_1$ of a $1^{st}$ first sub-sequence is greater than or equal to a length of another first sub-sequence; the processing unit is further configured to: separately map the K first sub-sequences into K second sub-sequences based on the common sequence group; and the transceiver unit is configured to output a second sequence, where the second sequence includes the K second sub-sequences.

In a possible implementation, the common sequence group may be a sequence group agreed on by a receive end and a transmit end, or may be a group specified in a protocol. A length of each sequence in the K first sub-sequences is also agreed on in advance by the receive end and the transmit end, and a length of a $1^{st}$ first sub-sequence is related to a quantity of sequences in the common sequence group.

In a possible implementation, the processing unit is specifically configured to select, from the common sequence group based on values of the $1^{st}$ to $n^{th}$ first sub-sequences, the $n^{th}$ second sub-sequence corresponding to the $n^{th}$ first sub-sequence, where n is an integer and meets $n \in [2, K]$.

In a possible implementation, the $n^{th}$ first sub-sequence corresponds to an $n^{th}$ sequence subgroup that includes $2^{\wedge}B_n$ sequences in the common sequence group, the $n^{th}$ second sub-sequence is a sequence in the $n^{th}$ sequence subgroup, the $n^{th}$ sequence subgroup is determined based on values of the $1^{st}$ to $(n-1)^{th}$ first sub-sequences, and the $n^{th}$ second sub-sequence is selected from the $n^{th}$ sequence subgroup based on the value of the $n^{th}$ first sub-sequence.

In a possible implementation, the $n^{th}$ second sub-sequence is selected from $f(0)^{th}, f(1)^{th}, \ldots, f(2^{\wedge}(B_n)-1)^{th}$ columns in the common sequence group based on the value of the $n^{th}$ first sub-sequence. $f( )$ meets $f(c(i)) = c(\mod((i+1), N))$, $c(i) = \mod(b*i*(i+1)/2, N)$ and $i = 0, 1, \ldots, N-1$; $b = \mod(a, N/2)*2+1$, and the parameter a is determined based on values of the $1^{st}$ to $(n-1)^{th}$ first sub-sequences.

Possibly, the parameter a is a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

In a possible implementation, the processing unit is further configured to select the $n^{th}$ second sub-sequence from $\mod(a+i, N)^{th}$ columns in the common sequence group based on the value of the $n^{th}$ first sub-sequence, where $i = 0, 1, \ldots, 2^{\wedge}(B_n)-1$, and the parameter a is determined based on values of the $1^{st}$ to $(n-1)^{th}$ first sub-sequences.

Possibly, the parameter a is a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

In a possible implementation, the processing unit is further configured to select the $n^{th}$ second sub-sequence from $f(0)^{th}, f(1)^{th}, \ldots, f(2^{\wedge}(B_n)-1)^{th}$ columns in the common sequence group based on the value of the $n^{th}$ first sub-sequence, where $f(\ )$ meets $f(i)=\mod(((1-a^{\wedge}i)* b)/(1-a), N)$, $i=0, 2, \ldots, N-1$, and the parameter a and the parameter b are determined based on values of $1^{st}$ to $(n-1)^{th}$ first sub-sequences.

Possibly, the parameter a is a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences. The parameter b is a sum of the values of the $1^{st}$ to $(n-1)^{th}$ first sub-sequences, or a product of the values of the $1^{st}$ to $(n-1)^{th}$ first sub-sequences, or obtained through a further operation on a product of values of the $1^{st}$ to $(n-1)^{th}$ first sub-sequences.

It should be noted that, for beneficial effects of the implementations of the communication apparatus provided in the third aspect of embodiments of this application, refer to beneficial effects of the data transmission method according to the first aspect. Details are not described herein again.

According to a fourth aspect, this application provides a communication apparatus. The communication apparatus may be configured to perform the method in the first aspect. The communication apparatus may be a terminal device or a network device, or may be an apparatus (for example, a chip, a chip system, or a circuit) in a terminal device or a network device, or may be an apparatus that can be used together with a terminal device or a network device. In a possible implementation, the communication apparatus may include modules or units that one to one correspond to the methods/operations/steps/actions described in the first aspect. The modules or units may be hardware circuits, software, or may be implemented by a hardware circuit in combination with software. In a possible implementation, the communication apparatus may include a processing unit and a transceiver unit. The processing unit may be configured to invoke the transceiver unit to perform receiving and/or sending functions. For example, the transceiver unit is configured to receive a second sequence, where the second sequence includes K second sub-sequences; and the processing unit is configured to: separately map the K second sub-sequences into K first sub-sequences based on a common sequence group, where the processing unit is further configured to determine a first sequence based on the K first sub-sequences.

In a possible implementation, the common sequence group may be a sequence group agreed on by a receive end and a transmit end, or may be a group specified in a protocol. A length of each sequence in the K first sub-sequences is also agreed on in advance by the receive end and the transmit end, and a length of a $1^{st}$ first sub-sequence is related to a quantity of sequences in the common sequence group.

In a possible implementation, the processing unit is specifically configured to: detect K second sub-sequences based on a common sequence group, to separately determine values of K first sub-sequences; and determine the K first sub-sequences based on the values of the K first sub-sequences.

In a possible implementation, the processing unit is specifically configured to: detect the $1^{st}$ second sub-sequence based on the common sequence group, to determine the value of the $1^{st}$ first sub-sequence; determine a sequence subgroup corresponding to the $2^{nd}$ second sub-sequence based on the determined value of the $1^{st}$ first sub-sequence and the common sequence group; and the $2^{nd}$ second sub-sequence is detected based on the sequence subgroup corresponding to the second sub-sequence, to determine a value of the $2^{nd}$ first sub-sequence.

In a possible implementation, the processing unit is specifically configured to: determine, based on values of $1^{st}$ to $(n-1)^{th}$ first sub-sequences and the common sequence group, a sequence subgroup corresponding to an $n^{th}$ second sub-sequence, where n is an integer greater than or equal to 2 and less than or equal to K; and detect the $n^{th}$ second sub-sequence based on the sequence subgroup corresponding to the $n^{th}$ second sub-sequence, to determine a value of the $n^{th}$ first sub-sequence.

In a possible implementation, the performing detection based on the common sequence group or the sequence subgroup may be specifically performing correlation detection, where a sequence number or an index number of a sequence with a highest correlation in the common sequence group or the sequence subgroup is a value of a corresponding second sub-sequence.

It should be noted that, for beneficial effects of the implementations of the communication apparatus provided in the fourth aspect of embodiments of this application, refer to beneficial effects of the data transmission method according to the first aspect. Details are not described herein again.

According to a fifth aspect, an embodiment of this application further provides a communication apparatus, including a processor configured to execute a computer program or executable instructions stored in a memory. When the computer program or the executable instructions are executed, the apparatus is enabled to perform the method in the first aspect and the possible implementations of the first aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or a communication interface of another type.

According to a sixth aspect, an embodiment of this application further provides a communication apparatus, including a processor configured to execute a computer program or executable instructions stored in a memory. When the computer program or the executable instructions are executed, the apparatus is enabled to perform the method in the second aspect and the possible implementations of the second aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or a communication interface of another type.

According to a seventh aspect, an embodiment of this application further provides a communication apparatus, including an input/output interface and a logic circuit. The input/output interface is configured to input or output a signal or data. The input/output interface is specifically configured to obtain a first sequence. The input/output interface is further configured to output a second sequence, where the second sequence includes K second sub-sequences. The logic circuit is configured to perform the method according to any one of the first aspect or the possible implementations of the first aspect to determine the K second sub-sequences.

According to an eighth aspect, an embodiment of this application further provides a communication apparatus, including an input/output interface and a logic circuit. The input/output interface is configured to obtain a second sequence, where the second sequence includes K second sub-sequences. The logic circuit is configured to perform the method in any one of the second aspect or the possible implementations of the second aspect, to determine K first sub-sequences, to restore the first sequence.

According to a ninth aspect, an embodiment of this application further provides a computer-readable storage medium. The computer-readable storage medium stores a computer program. When the computer program is executed by a processor, a part or all of the steps of the method according to the first aspect and any possible implementation of the first aspect, or the second aspect and any possible implementation of the second aspect are performed.

According to a tenth aspect, an embodiment of this application further provides a computer program product including executable instructions. When the computer program product runs on user equipment, a part or all of the steps of the method according to the first aspect and any possible implementation of the first aspect, or the second aspect and any possible implementation of the second aspect are performed.

According to an eleventh aspect, an embodiment of this application further provides a chip system. The chip system includes a processor, may further include a memory, and is configured to implement the method according to the first aspect and any possible implementation of the first aspect, or the second aspect and any possible implementation of the second aspect. The chip system may include a chip, or may include a chip and another discrete component.

BRIEF DESCRIPTION OF DRAWINGS

The following describes some accompanying drawings in embodiments of this application.

DESCRIPTION OF EMBODIMENTS

Figure 1:
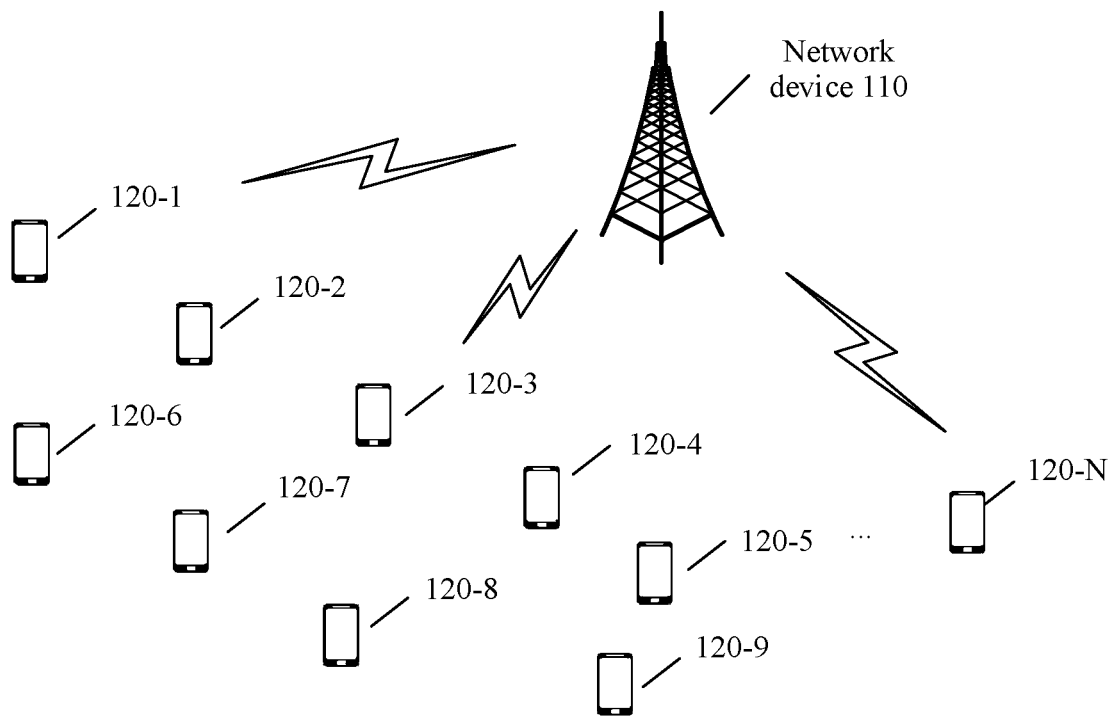
FIG. 1 is a schematic diagram of a communication system according to an embodiment of this application.

Embodiments of this application provide a data transmission method and an apparatus, to improve data transmission accuracy in a scenario in which a large quantity of users transmit small packets.

It should be noted that, the term "and/or" in this application describes only an association relationship for describing associated objects and represents that three relationships may exist. For example, A and/or B may represent the following three cases: Only A exists, both A and B exist, and only B exists. In the specification and claims in embodiments of this application, the terms "first", "second", and so on are intended to distinguish between different objects but do not indicate a particular order of the objects. For example, a first sequence, a second sequence, and the like are used to distinguish between different sequences, but are not used to describe a specific order of the target object. In embodiments of this application, words such as "example", "in an example", and "for example" are used to represent giving an example, an illustration, or a description. Any embodiment or design scheme described as an "example", "in an example", or "for example" in embodiments of this application should not be explained as being more preferred or having more advantages than another embodiment or design scheme. Exactly, use of the word such as "example" or "for example" is intended to present a relative concept in a specific manner. In the description of the embodiment of this application, unless otherwise stated, "multiple" means two or more than two. For example, a plurality of processing units mean two or more processing units, and a plurality of systems mean two or more systems. In embodiments of this application, what is "agreed on by a receive end and a transmit end" may be specified in a protocol, or may be negotiated by the receive end and the transmit end by using signaling, or may be configured by the receive end or the transmit end. This is not limited in this application.

First, related concepts in embodiments of this application are briefly described as follows.

mMTC is one of the three typical services supported by 5G. Typical mMTC services include smart grid power distribution automation, a smart city, and the like. Mainly features of the mMTC are a huge quantity of connected devices, a small amount of data to be transmitted, and data being insensitive to transmission latency.

An MTC device is a terminal device that supports the mMTC service. The MTC device may be a wireless device or a wired device. The wireless device may be a device with a wireless transceiver function, and may be deployed on land, including an indoor device, an outdoor device, a handheld device, or an in-vehicle device. Alternatively, the MTC device may be deployed on water (for example, a ship); or may be deployed in air (for example, on an airplane, a balloon, or a satellite). The MTC device may be a mobile phone (mobile phone), a tablet computer (pad), a computer with a wireless transceiver function, user equipment (UE), an access terminal, a subscriber unit (subscriber unit), a subscriber station, a mobile station (mobile station), a handheld device with a wireless communication function, a computing device, another processing device connected to a wireless modem, a vehicle-mounted device or a wearable device, a virtual reality (VR) terminal device, an augmented reality (AR) terminal device, a wireless device in industrial control (industrial control), a wireless device in self driving (self driving), a wireless device in remote medical (remote medical), a wireless device in a smart grid (smart grid), a wireless device in transportation safety (transportation safety), a wireless device in a smart city (smart city), a wireless device in a smart home (smart home), and the like. This is not limited herein.

The technical solutions provided in this application may be applied to a plurality of communication systems, for example, a 4th generation (4G) communication system, for example, a Long Term Evolution (LTE) system, a Worldwide Interoperability for Microwave Access (WiMAX) communication system, a 5th generation (5G) communication system, for example, a new radio (NR) system, and a future mobile communication system.

FIG. 1 is an example of an architecture of a communication system to which an embodiment of this application is applicable. As shown in FIG. 1, this network architecture includes a network device 110 and a terminal device (120-1, 120-2, . . . , 120-N, and the like), and a base station 10 is connected to each terminal device by using a wireless network.

The terminal device 120 may be any one of the foregoing MTC devices, and details are not described herein again.

The network device 110 may be an evolved NodeB (eNB or eNodeB) in LTE, or a base station in a 5G network or a future evolved public land mobile network (PLMN), a broadband network service gateway (BNG), an aggregation switch, a non-3rd Generation Partnership Project (3GPP) access device, or the like. Optionally, a network device in embodiments of this application may include base stations in various forms, for example, a macro base station, a micro base station (also referred to as a small cell), a relay station, an access point, a 5G station or a future station, a transmission reception point (TRP), a transmission point (TP), a mobile switching center, a device that provides a base station function in device-to-device (D2D), vehicle-to-everything (V2X), and machine-to-machine (M2M) communication, and the like. This is not specifically limited in embodiments of this application.

The network device 110 may interact with another network device (not shown), and may communicate with and interact with a core network device, to provide a communication service for the terminal device. For example, the core network device is a device in a 5G core network (CN). As a bearer network, the core network provides an interface to a data network, provides communication connection, authentication, management, and policy control for user equipment (UE), bears data services, and the like.

In an mMTC scenario, there are a large quantity of potential to-be-accessed users in a cell, and these users may be any one of the foregoing terminal devices. Although data packets sent by these users each time are small, because there are a large quantity of users, there is a great challenge to access performance and data transmission performance of the network.

For the mMTC scenario, currently an unsourced transmission (Unsourced transmission) solution is mostly discussed. A plurality of users transmit data by using a same codebook, and no user identifier is carried. This solution is considered to support large-scale access in the mMTC scenario. For example, information bits sent by a user are first divided into blocks, and check bits are added after each block of information bits, to form multiple encoded sub-blocks. Then, a sequence is selected from a preset sequence group (codebook) based on a binary value of the encoded sub-block for sending. A sequence number of the sequence in the sequence set is equal to the binary value of the encoded sub-block.

In the foregoing solution, the transmit end needs to calculate a check bit for each segment of data, and also needs to check received data based on the check bit. Therefore, implementation complexity is high.

To improve accuracy of data transmission in a scenario, such as mMTC, in which a large quantity of users transmit small packets of data, embodiments of this application provide a data transmission method and an apparatus.

The following describes embodiments of this application with reference to the accompanying drawings in embodiments of this application.

It should be first noted that the "common sequence group" in this application includes sequences that are sequentially sorted. Assuming that the common sequence group includes N sequences, sequence numbers of the sequences in the common sequence are sequentially 0 to N−1. Possibly, the common sequence group may be in a matrix form of M rows and N columns. In this case, the common sequence group includes N sequences, and a length of each sequence is M. Possibly, in the common sequence group, a length of each sequence may be unequal. Possibly, the common sequence group may be in a form of a common sequence set. In this case, each sequence in the sequence set has a unique and different number or index. Assuming that the common sequence set includes N sequences, a value range of the number or index is 0 to N−1. The "sequence subgroup" in this application includes sequences in a common sequence group. Correspondingly, sequences in the sequence subgroup are also sequentially sorted.

Figure 2:
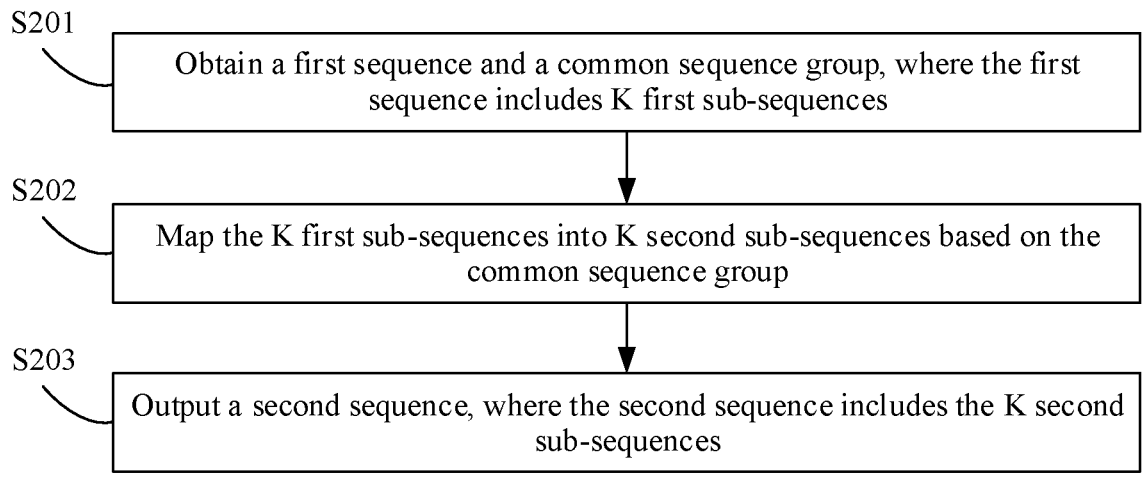
FIG. 2 is a schematic flowchart of a data transmission method at a transmit end according to an embodiment of this application.

FIG. 2 is a schematic flowchart of data transmission at a transmit end according to an embodiment of this application. It should be noted that the transmit end is a side that sends data, and the method may be performed by a terminal device, or may be performed by a network device.

S201: Obtain a first sequence and a common sequence group, where the first sequence includes K first sub-sequences.

A quantity of sequences in the common sequence group is N, and N is an integer power of 2.

It should be noted that, the common sequence group is a preconfigured sequence group, and the common sequence group may be specified in a protocol. Alternatively, the common sequence group may be negotiated in advance by a receive end and the transmit end. For example, when the transmit end is a terminal device, the common sequence group may be delivered by a network device to the terminal device.

The first sequence includes K first sub-sequences, where lengths of the K first sub-sequences are sequentially $B_1$, $B_2$, . . . , and $B_K$, K is a positive integer, a length of a $1^{st}$ first sub-sequence meets $B_1=\log_2 N$, and is greater than or equal to a length of another first sub-sequence (for example, $B_2$, . . . , $B_K$), and K is a positive integer.

In a possible implementation, after the first sequence is obtained, the first sequence is divided into K first sub-sequences.

It should be noted that a length of each of the K first sub-sequences is agreed on in advance by the receive end and the transmit end, and the length of the $1^{st}$ first sub-sequence is related to the quantity of sequences in the common sequence group. In a small packet transmission scenario such as mMTC, a length of data that can be transmitted, that is, a length of the first sequence, may be limited. Correspondingly, a manner of data segmentation or block division, that is, a length of each of the K first sub-sequences, may also be limited. A plurality of users in a network may use one same or more data lengths to transmit data.

In another possible implementation, after the first sequence is obtained, the first sequence is divided into K sub-sequences, and a check bit is added to all or a part of the K sub-sequences to obtain the K first sub-sequences. In other words, all or a part of the K first sub-sequences include a check bit.

It should be noted that, if one or more first sub-sequences include a check bit, the receive end and the transmit end agree on a manner of setting the check bit and a manner of calculating a check value, so that the receive end successfully performs check after receiving a signal. In this implementation in which the check bit is included, data transmission reliability can be further enhanced.

In addition, it should be noted that an order of obtaining the first sequence and obtaining the common sequence group is not limited in this embodiment of this application. The first sequence and the common sequence group may also be obtained at the same time.

S202: Map the K first sub-sequences into K second sub-sequences based on the common sequence group.

In a possible implementation, an $n^{th}$ second sub-sequence corresponding to an $n^{th}$ first sub-sequence is selected from the common sequence group based on values of $1^{st}$ to $n^{th}$ first sub-sequences, where n is greater than or equal to 2 and less than or equal to K, that is, $n \in [2, K]$.

When n is 1, the $n^{th}$ second sub-sequence is selected from the common sequence group based on a value of the $1^{st}$ first sub-sequence.

When n is greater than or equal to 2, the $n^{th}$ second sub-sequence is a sequence in an $n^{th}$ sequence subgroup, and the $n^{th}$ sequence subgroup includes $2^{\hat{}}Bn$ sequences in the common sequence group. Specifically, the $n^{th}$ sequence subgroup is determined based on values of the $1^{st}$ to $(n-1)^{th}$ first sub-sequences, and the $n^{th}$ second sub-sequence is selected from the $n^{th}$ sequence subgroup based on the value of the $n^{th}$ first sub-sequence.

It should be noted that the value of the $n^{th}$ first sub-sequence is related to a value of each bit in the $n^{th}$ first sub-sequence that actually needs to be sent, and a value range of the $n^{th}$ first sub-sequence is 0 to $2^{\hat{}}(Bn)-1$.

S203: Output a second sequence, where the second sequence includes the K second sub-sequences.

In a possible implementation, before the second sequence is output, some of the K second sub-sequences are truncated, that is, a part of the output K second sub-sequences are truncated sequences.

A truncation manner, for example, a quantity and sequence numbers of the truncated second sub-sequences, and lengths of the truncated sequences, is agreed on by the transmit end and the receive end in advance based on an actual communication status, or is specified in a protocol. This is not limited in this application. For example, $1^{st}$ to $m^{th}$ second sub-sequences are sequences of a normal length, and $m^{th}$ to $K^{th}$ second sub-sequences are sequences of a ¾ length, where m is an integer greater than 1 and less than or equal to K. Alternatively, $1^{st}$ to $m^{th}$ second sub-sequences are sequences of a normal length, $m^{th}$ to $n^{th}$ second sub-sequences are sequences of a ¾ length, and $n^{th}$ to $K^{th}$ second sub-sequences are sequences of a ½ length, where m is an integer greater than 1 and less than or equal to n, and n is an integer greater than or equal to m and less than or equal to K. Alternatively, the K second sub-sequences are all truncated sequences. This is not limited in this application.

In this implementation, when the second sub-sequence is truncated and then sent, a length of data sent each time is shortened, so that transmission efficiency can be improved.

In another aspect, no additional processing is performed on the second sub-sequences, and the second sequences are sequentially output, so that accuracy of data transmission can be improved.

In the method shown in FIG. 2, the first sequence including the K first sub-sequences is obtained, the K first sub-sequences are mapped into the K second sub-sequences based on the common sequence group, and the second sequence is output. When the K first sub-sequences are mapped into the K second sub-sequences, a sequence subgroup corresponding to the $n^{th}$ second sub-sequence is determined from the common sequence group based on values of the first n-1 first sub-sequences, and then the $n^{th}$ first sub-sequence is mapped into the $n^{th}$ second sub-sequence based on the sequence subgroup, so that the receive end restores the first sequence according to a corresponding method. According to the foregoing technical solution, transmission reliability when a large quantity of users transmit small packets of data is improved.

Figure 3:
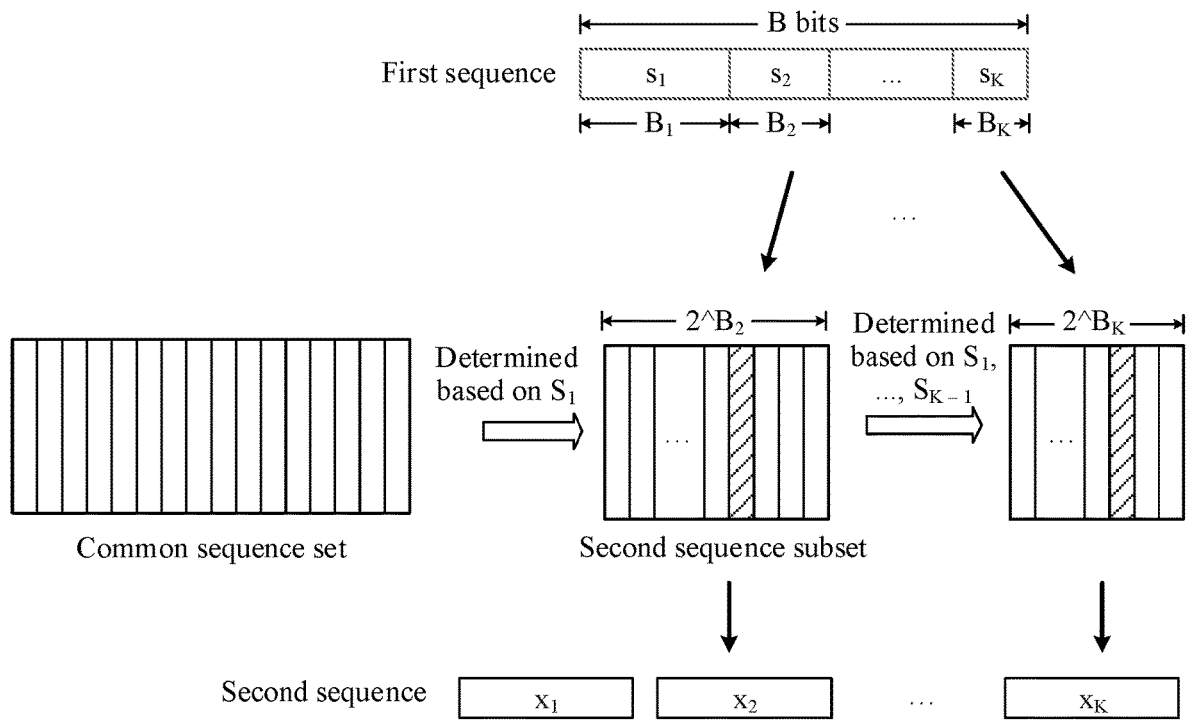
FIG. 3 is a schematic diagram of a bit sequence mapping method according to an embodiment of this application.

FIG. 3 is a schematic diagram of a method for mapping K first sub-sequences into K second sub-sequences based on a common sequence group according to an embodiment of this application.

A first sequence whose length is B bits includes K first sub-sequences, where K is an integer greater than or equal to 2, lengths of the K first sub-sequences are sequentially $B_1$, $B_2$, . . . , and $B_K$, that is, $B = \Sigma_{K=1}^{K} B_k$, and values of the K first sub-sequences are sequentially $S_1$, $S_2$, . . . , and $S_K$. A value of an $n^{th}$ first sub-sequence is a decimal number corresponding to a bit sequence whose length is $B_n$.

The $n^{th}$ first sub-sequence corresponds to an $n^{th}$ sequence subgroup whose quantity of sequences is $2^{B_n}$. Each sequence subgroup is generated by selecting some sequences from a common sequence group. A sequence selected from the $n^{th}$ sequence subgroup is related to values $S_1$, . . . , and $S_{n-1}$ of a $1^{st}$ segment of bits to an $(n-1)^{th}$ segment of bits, where $n \in [2, K]$. When n is 1, a first sequence subgroup is a common sequence group.

The second sequence includes the K second sub-sequences, that is, $X_1, X_2, \ldots, X_K$. A $1^{st}$ second sub-sequence $X_1$ is selected from the common sequence group based on the value $S_1$ of the $1^{st}$ first sub-sequence. Specifically, a sequence number of $X_1$ in the common sequence group is equal to $S_1$. The $n^{th}$ second sub-sequence $X_n$ is selected from the $n^{th}$ sequence subgroup based on the value $S_n$ of the $n^{th}$ first sub-sequence. Specifically, a sequence number of $X_n$ in the $n^{th}$ sequence subgroup is equal to $S_n$.

It should be noted that the value $S_n$ of the $n^{th}$ first sub-sequence is related to a value of each bit in the $n^{th}$ first sub-sequence that actually needs to be sent, and a value range of the value $S_n$ is 0 to $2^{\hat{}}(Bn)-1$. In addition, sequence numbers of sequences in the common sequence group are sequentially 0 to $2^{\hat{}}(B_1)-1$, and sequence numbers in the $n^{th}$ sequence subgroup are sequentially 0 to $2^{\hat{}}(Bn)-1$.

In this application, a value of a sequence Z is a value of a binary number $Z_0 Z_1, \ldots, Z_{L-1}$ representing a value of a binary sequence Z $\{Z_0, Z_1, \ldots, Z_{L-1}\}$ whose length is L.

For example, it is assumed that the $1^{st}$ first sub-sequence is 0 0 0 1 0 1 0 0, the $2^{nd}$ first sub-sequence is 1 0 0 1 0, and the $3^{rd}$ first sub-sequence is 0 1 1. In this case, $B_1=8$, $S_1=20$; $B_2=5$, $S_2=18$; $B_3=3$, $S_3=3$.

In this case, the $1^{st}$ second sub-sequence $X_1$ is a $20^{th}$ sequence in the common sequence group, the $2^{nd}$ first sub-sequence corresponds to a second sequence subgroup whose quantity of sequences is $2^{\hat{}}B_2=32$, the second sequence subgroup is selected from the common sequence group based on $S_1$, and the $2^{nd}$ second sub-sequence $X_2$ is an $18^{th}$ sequence in the second sequence subgroup. The $3^{rd}$ first sub-sequence corresponds to a third sequence subgroup whose quantity of sequences is $2^{\hat{}}B_3=8$, the third sequence subgroup is selected from the common sequence group based on $S_1$ and $S_2$, and the third second sub-sequence $X_3$ is the third sequence in the third sequence subgroup.

In this application, a sequence subgroup corresponding to each first sub-sequence is dynamically determined. The following describes in detail a method for determining, based on the values of $1^{st}$ to $(n-1)^{th}$ first sub-sequences, the $n^{th}$ sequence subgroup corresponding to the $n^{th}$ first sub-sequence.

In a possible implementation, the $n^{th}$ second sub-sequence is selected from $f(0)^{th}$, $f(1)^{th}$, ..., $f(2^{\hat{}}(Bn)-1)^{th}$ sequences in the common sequence group based on the value of the $n^{th}$ first sub-sequence. In other words, the $n^{th}$ sequence subgroup may be formed by sequentially sorting $f(0)^{th}$, $f(1)^{th}$, ..., $f(2^{\hat{}}(Bn)-1)^{th}$ sequences in the common sequence group. $f(\ )$ meets $f(c(i))=c(\mod((i+1), N))$, $i=0, 1, \ldots, N-1$, and N is a quantity of sequences in the common sequence group. An array $c(i)$ is determined based on a parameter b, the parameter b is determined based on a parameter a, and the parameter a is determined based on the values of $1^{st}$ to $(n-1)^{th}$ first sub-sequences.

Possibly, the parameter a may be a sum of $S_1, S_2, \ldots, S_{k-1}$, or may be a product of $S_1, S_2, \ldots, S_{k-1}$, or may be obtained by performing an operation on a product of $S_1, S_2, \ldots, S_{k-1}$ and a sum of $S_1, S_2, \ldots, S_{k-1}$.

The parameter b is determined based on the parameter a, and the parameter b may be specifically obtained according to the following formula:

$$b=\mod(a, N/2)*2+1, \text{ where}$$

N is the quantity of sequences in the common sequence group, and $\mod(x, y)$ indicates x mod y.

The array $c(i)$ is determined based on the parameter b, and the array $c(i)$ may be specifically obtained according to the following formula:

$$c(i)=\mod(b*i*(i+1)/2, N), \text{ where } i=0, 1, N-1.$$

For example, it is assumed that the $1^{st}$ first sub-sequence is 0 0 0 1 0 1 0 0, the $2^{nd}$ first sub-sequence is 1 0 0 1 0, and the $3^{rd}$ first sub-sequence is 0 1 1. In this case, $B_1=8$, $S_1=20$; $B_2=5$, $S_2=18$; $B_3=3$, $S_3=3$; and the quantity of sequences in the common sequence group is $N=2^{\hat{}}B_1=256$. The following is described with an example of obtaining the $3^{rd}$ second sub-sequence $X_3$.

The parameter a may be $a=S_1+S_2=38$, or may be $a=S_1*S_2=360$. The former is used as an example:

$$b=\mod(a, N/2)*2+1=\mod(38, 256/2)*2+1=77$$

$$c(i)=\mod(b*i*(i+1)/2, N)=\mod(77*i*(i+1)/2, 256),$$
$$\text{where } i=0, 1, \ldots, 255$$

The array $c(i)$ is {0, 77, 231, 206, 2, ..., 205, 128}.

The third sequence subgroup is formed by sequentially sorting $f(0)^{th}, f(1)^{th}, \ldots,$ and $f(7)^{th}$ sequences in the common sequence group, and $f(\ )$ meets $f(c(i))=c(\mod((i+1), 256))$.

i corresponding to $f(0)$ can make $c(i)=0$, that is, $i=0$, and $f(0)=c(\mod((0+1), 256))=c(1)=77$.

i corresponding to $f(1)$ can make $c(i)=1$, that is, $i=102$, and $f(1)=c(\mod((102+1), 256))=c(103)=252$.

i corresponding to $f(2)$ can make $c(i)=2$, that is, $i=4$, and $f(2)=c(\mod((4+1), 256))=c(5)=131$.

i corresponding to $f(3)$ can make $c(i)=3$, that is, $i=250$, and $f(3)=c(\mod((250+1), 256))=c(251)=130$.

i corresponding to $f(7)$ can make $c(i)=7$, that is, $i=66$, and $f(7)=c(\mod((66+1), 256))=c(67)=46$.

In other words, the third sequence subgroup is formed by sequentially sorting $77^{th}, 252^{nd}, 131^{st}, 130^{th}, \ldots,$ and $46^{th}$ sequences in the common sequence group.

The $3^{rd}$ second sub-sequence $X_3$ is the $S_2^{th}$ sequence, that is, the $3^{rd}$ sequence in the third sequence subgroup, that is, the $130^{th}$ sequence in the common sequence group.

In another possible implementation, the $n^{th}$ second sub-sequence is selected from $\mod(a+i, N)^{th}$ sequences in the common sequence group based on the value of the $n^{th}$ first sub-sequence. In other words, the $n^{th}$ sequence subgroup may be obtained by sequentially sorting the $\mod(a+i, N)^{th}$) sequences in the common sequence group. $i=0, 1, \ldots, 2^{\hat{}}(Bn)-1$, N is a quantity of sequences in the common sequence group, and a parameter a is determined based on values of $1^{st}$ to $(n-1)^{th}$ first sub-sequences.

Possibly, the parameter a may be a sum of $S_1, S_2, \ldots, S_{k-1}$, or may be a product of $S_1, S_2, \ldots, S_{k-1}$, or may be obtained by performing an operation on a product of $S_1, S_2, \ldots, S_{k-1}$ and a sum of $S_1, S_2, \ldots, S_{k-1}$.

For example, it is assumed that the $1^{st}$ first sub-sequence is 0 0 0 1 0 1 0 0, the $2^{nd}$ first sub-sequence is 1 0 0 1 0, and the $3^{rd}$ first sub-sequence is 0 1 1. In this case, $B_1=8$, $S_1=20$; $B_2=5$, $S_2=18$; $B_3=3$, $S_3=3$; and the quantity of sequences in the common sequence group is $N=2^{\hat{}}B_1=256$.

For a $2^{nd}$ second sub-sequence $X_2$, the parameter a may be $a=S_1=20$. Alternatively, the parameter a may be obtained by performing another operation on 20. $a=20$ is used as an example.

The second sequence subgroup is formed by sequentially sorting $\mod(20+i, 256)^{th}$ sequences in the common sequence group, where $i=0, 1, \ldots, 31$. That is, the second sequence subgroup is formed by sequentially sorting $20^{th}, 21^{st}, \ldots,$ and $51^{st}$ sequences in the common sequence group.

The $2^{nd}$ second sub-sequence $X_2$ is the $18^{th}$ sequence in the second sequence subgroup, that is, the $38^{th}$ sequence in the common sequence group.

For a $3^{rd}$ second sub-sequence $X_3$, the parameter a may be $a=S_1+S_2=38$, or may be $a=S_1*S_2=360$, or may be a value obtained by performing another operation on 360. $a=360$ is used as an example.

The third sequence subgroup is formed by sequentially sorting $\mod(360+i, 256)^{th}$ sequences in the common sequence group, where $i=0, 1, \ldots, 7$. That is, the third sequence subgroup is formed by sequentially sorting $104^{th}, 105^{th},$ and $111^{st}$ sequences in the common sequence group.

The $3^{rd}$ second sub-sequence $X_3$ is the $3^{rd}$ sequence in the third sequence subgroup, that is, the $\mod(360+3, 256)^{th}=107^{th}$ sequence in the common sequence group.

In still another possible implementation, the $n^{th}$ second sub-sequence is selected from $f(0)^{th}, f(1)^{th}, \ldots, f(2^{\hat{}}(B_n)-1)^{th}$ sequences in the common sequence group based on a value of the $n^{th}$ first sub-sequence. In other words, the $n^{th}$ sequence subgroup may be formed by sequentially sorting $f(0)^{th}, f(1)^{th}, \ldots, f(2^{\hat{}}(B_n)-1)^{th}$ sequences in the common sequence group. $f(\ )$ meets $f(i)=\mod(((1-a^{\hat{}}i)*b)/(1-a), N)$, $i=0, 2, \ldots, N-1$, N is a quantity of sequences in the common sequence group, and a parameter a and a parameter b are determined based on values of $1^{st}$ to $(n-1)^{th}$ first sub-sequences.

Possibly, the parameter a may be a sum of $S_1, S_2, \ldots, S_{k-1}$, or may be a product of $S_1, S_2, \ldots, S_{k-1}$, or may be obtained by performing an operation on a product of $S_1, S_2, \ldots, S_{k-1}$ and a sum of $S_1, S_2, \ldots, S_{k-1}$.

Possibly, the parameter b may be a sum of $S_1, S_2, \ldots, S_{k-1}$, or may be a product of $S_1, S_2, \ldots, S_{k-1}$, or may be obtained by performing an operation on a product of $S_1, S_2, \ldots, S_{k-1}$ and a sum of $S_1, S_2, \ldots, S_{k-1}$.

For example, it is assumed that the $1^{st}$ first sub-sequence is 0 0 0 1 0 1 0 0, the $2^{nd}$ first sub-sequence is 1 0 0 1 0, and the $3^{rd}$ first sub-sequence is 0 1 1. In this case, $B_1=8$, $S_1=20$; $B_2=5$, $S_2=18$; $B_3=3$, $S_3=3$; and the quantity of sequences in the common sequence group is $N=2^{\hat{}}B_1=256$.

For the $2^{nd}$ second sub-sequence $X_2$, the parameter a may be $a=S_1=20$, or may be a value obtained by performing another operation on 20, and the parameter b may be $b=S_1=20$, or may be a value obtained by performing another operation on 20. $a=20$ and $b=20$ is used as an example.

The second sequence subgroup is formed by sequentially sorting $mod(((1-20\hat{}i)* 20)/(1-20), 256)^{th}$ sequences in the common sequence group, where $i=0, 1, \ldots, 31$. That is, the second sequence subgroup is formed by sequentially sorting $0^{th}$, $20^{th}$, $164^{th}$, ..., and $28^{th}$ sequences in the common sequence group.

The $2^{nd}$ second sub-sequence $X_2$ is the $18^{th}$ sequence in the second sequence subgroup, and the $mod(((1-20\hat{}18)*20)/(1-20), 256)^{th}=228^{th}$ sequences in the common sequence group.

For the $3^{rd}$ second sub-sequence $X_3$: the parameter a may be $a=S_1+S_2=38$, or may be $a=S_1*S_2=360$, or may be a value obtained by performing another operation on 360; and the parameter b may be $a=S_1+S_2=38$, or may be $b=S_1*S_2=360$, or may be a value obtained by performing another operation on 360. $a=38$ and $b=360$ is used as an example.

The third sequence subgroup is formed by sequentially sorting $mod(((1-38\hat{}i)* 360)/(1-38), 256)^{th}$ sequences in the common sequence group, where $i=0, 2, \ldots, 7$. That is, the second sequence subgroup is formed by sequentially sorting $0^{th}$, $104^{th}$, $39^{th}$, ..., and $72^{nd}$ sequences in the common sequence group.

The $3^{rd}$ second sub-sequence $X_2$ is the $3^{rd}$ sequence in the third sequence subgroup, and the $mod(((1-38\hat{}3)*360)/(1-38), 256)^{th}=120^{th}$ sequence in the common sequence group.

Figure 4:
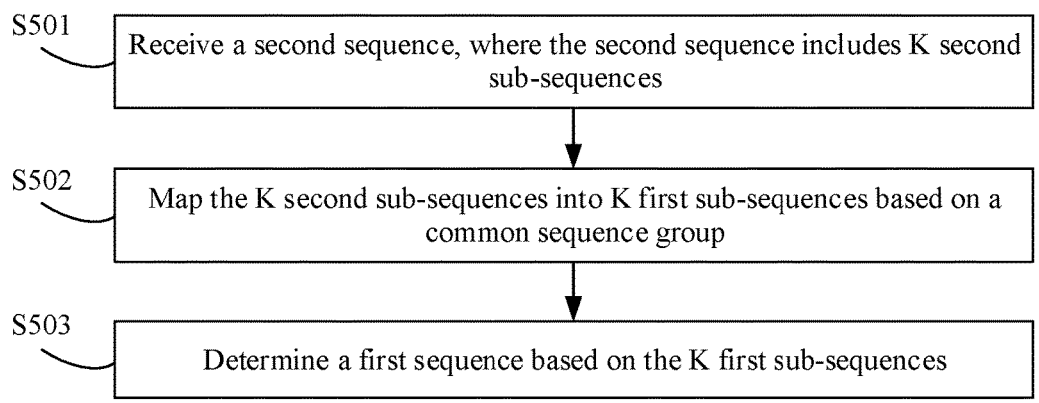
FIG. 4 is a schematic flowchart of a data transmission method at a receive end according to an embodiment of this application.

FIG. 4 is a schematic flowchart of data transmission at a receive end according to an embodiment of this application. It should be noted that the receive end is a side that receives data, and the method may be performed by a network device or a terminal device.

S501: Receive a second sequence, where the second sequence includes K second sub-sequences.

In a possible implementation, a part of the K second sub-sequences are truncated sequences. A truncation manner, for example, a quantity and sequence numbers of truncated second sub-sequences, and lengths of truncated sequences, is agreed on in advance by a transmit end and the receive end.

S502: Map the K second sub-sequences into K first sub-sequences based on a common sequence group.

The common sequence group is a preconfigured sequence group. The common sequence group may be specified in a protocol, or may be negotiated in advance by the transmit end and the receive end, for example, delivered by the network device to a terminal device. In addition, a length of each of the K first sub-sequences is also agreed on by the transmit end and the receive end, or specified in a protocol.

The mapping the K second sub-sequences into K first sub-sequences includes: detecting the K second sub-sequences based on the common sequence group, determining values of the K first sub-sequences, and determining the K first sub-sequences based on the determined values of the K first sub-sequences. Specifically:

the detecting the K second sub-sequences based on the common sequence group, and determining values of the K first sub-sequences includes:

detecting a $1^{st}$ second sub-sequence based on the common sequence group, and determining a value of a $1^{st}$ first sub-sequence;

determining, based on the value of the $1^{st}$ first sub-sequence and the common sequence group, a second sequence subgroup corresponding to a $2^{nd}$ second sub-sequence, and detecting the $2^{nd}$ second sub-sequence based on the second sequence subgroup to determine a value of a $2^{nd}$ first sub-sequence;

determining, based on the value of the $1^{st}$ first sub-sequence, the value of the $2^{nd}$ first sub-sequence, and the common sequence group, a third sequence subgroup corresponding to a $3^{rd}$ second sub-sequence, and detecting the $3^{rd}$ second sub-sequence based on the third sequence subgroup to determine a value of a $3^{rd}$ first sub-sequence; and by analogy, determining, based on values of $1^{st}$ to $(n-1)^{th}$ first sub-sequences and the common sequence group, an $n^{th}$ sequence subgroup corresponding to an $n^{th}$ second sub-sequence, where $n \in [2, K]$. Detect the $n^{th}$ second sub-sequence based on the $n^{th}$ sequence subgroup, and determine a value of the $n^{th}$ first sub-sequence.

For a method for determining, based on values of $1^{st}$ to $(n-1)^{th}$ first sub-sequences and the common sequence group, an $n^{th}$ sequence subgroup corresponding to an $n^{th}$ second sub-sequence, refer to the foregoing descriptions. Details are not described herein again.

The detecting a $1^{st}$ second sub-sequence based on the common sequence group, and determining a value of a $1^{st}$ first sub-sequence is specifically: detecting a correlation of the $1^{st}$ second sub-sequence based on the common sequence group, and determining a sequence number of a sequence with a highest correlation in the common sequence group, where the value of the $1^{st}$ first sub-sequence is equal to the sequence number.

The detecting the $n^{th}$ second sub-sequence based on the $n^{th}$ sequence subgroup, and determining a value of the $n^{th}$ first sub-sequence is specifically: detecting a correlation of the $n^{th}$ second sub-sequence based on the $n^{th}$ sequence subgroup, and determining a sequence number of a sequence with a highest correlation in the $n^{th}$ sequence subgroup, where the value of the $n^{th}$ first sub-sequence is equal to the sequence number.

In a possible implementation, when the $n^{th}$ second sub-sequence is a truncated sequence, the $n^{th}$ sequence subgroup is truncated in an agreed truncation manner, and a correlation of the $n^{th}$ second sub-sequence is detected based on the truncated sequence subgroup, to determine a sequence number of a sequence with a highest correlation in the truncated $n^{th}$ sequence subgroup, where the value of the $n^{th}$ first sub-sequence is equal to the sequence number.

The determining the K first sub-sequences based on the determined values of the K first sub-sequences includes:

determining a value of a bit of each first sub-sequence based on a length of each of the K first sub-sequences and a value of each first sub-sequence, to determine each first sub-sequence.

S503: Determine a first sequence based on the K first sub-sequences.

After the values of the bits of the first sub-sequences in the K first sub-sequences are obtained, the first sequence can be restored, and the first sequence is actual data to be transmitted by the transmit end.

In a possible implementation, when all or a part of the K first sub-sequences include a check bit, check is performed in a check manner agreed on by the receive end and the transmit end, and after check succeeds, the first sequence is restored.

In the method shown in FIG. 4, after receiving the second sequence including the K second sub-sequences, the receive end maps the K second sub-sequences into the K first sub-sequences based on the common sequence group, to restore the first sequence including the K first sub-sequences, that is, data actually transmitted by the transmit end. In a process of restoring a signal, values of the $1^{st}$ to $(n-1)^{th}$ first sub-sequences are first determined, and then the $n^{th}$ first sub-sequence is determined based on the values. The foregoing technical solutions can support data restoration at the receive end when a large quantity of users transmit small packets of data.

To implement functions in the foregoing methods provided in embodiments of this application, a receive end device and a transmit end device may include a hardware structure and/or a software module, to implement the foregoing functions in a form of the hardware structure, the software module, or a combination of the hardware structure and the software module. The receive end device may be a terminal device or a network device. Similarly, the transmit end device may be a terminal device or a network device. Whether a function in the foregoing functions is performed by using the hardware structure, the software module, or the combination of the hardware structure and the software module depends on particular applications and design constraints of the technical solutions.

Figure 5:
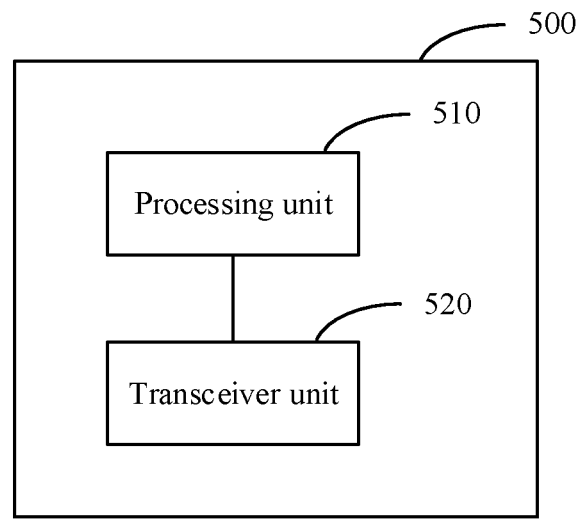
FIG. 5 is a schematic diagram of a structure of a communication apparatus according to an embodiment of this application.

As shown in FIG. 5, based on a same technical concept, an embodiment of this application further provides a communication apparatus 500. The communication apparatus 500 may be a terminal or a network device, an apparatus in a terminal device or a network device, or an apparatus that can be used together with a terminal device and a network device. In a possible implementation, the communication apparatus 500 may include modules or units that one to one correspond to the methods/operations/steps/actions of the transmit end or the receive end in the foregoing method embodiments. The units may be hardware circuits, software, or may be implemented by a hardware circuit in combination with software. In a possible implementation, the communication apparatus 500 may include a processing unit 510 and a transceiver unit 520. The processing unit 510 may be configured to invoke the transceiver unit 520 to perform receiving and/or sending functions.

When the communication apparatus 500 is configured to perform a method (for example, the method shown in FIG. 2) at the transmit end, the processing unit 510 is configured to obtain a first sequence and a common sequence group, where the first sequence includes K first sub-sequences. The processing unit 510 is further configured to: separately map the K first sub-sequences into K second sub-sequences based on the common sequence group. The transceiver unit 520 is configured to output a second sequence, where the second sequence includes the K second sub-sequences.

When the communication apparatus 500 is configured to perform a method (for example, the method shown in FIG. 4) at the receive end, the transceiver unit 520 is configured to receive a second sequence, where the second sequence includes K second sub-sequences. The processing unit 510 is configured to: separately map the K second sub-sequences into K first sub-sequences based on a common sequence group, and is further configured to determine a first sequence based on the K first sub-sequences.

The transceiver unit 520 is further configured to perform other receiving or sending steps or operations in the method of the transmit end or receive end in the foregoing method embodiments. The processing unit 510 may be further configured to perform other corresponding steps or operations other than receiving and sending in the method of the transmit end or receive end in the foregoing method embodiments. Details are not described herein again.

Division into the modules in embodiments of this application is an example; and is merely logical function division, and may be other division during actual implementation. In addition, functional modules or units in embodiments of this application may be integrated into one processor, or each of the modules or units may exist alone physically, or two or more of the modules or units may be integrated into one module. The integrated modules or units may be implemented in a form of hardware, or may be implemented in a form of a software functional module.

Figure 6:
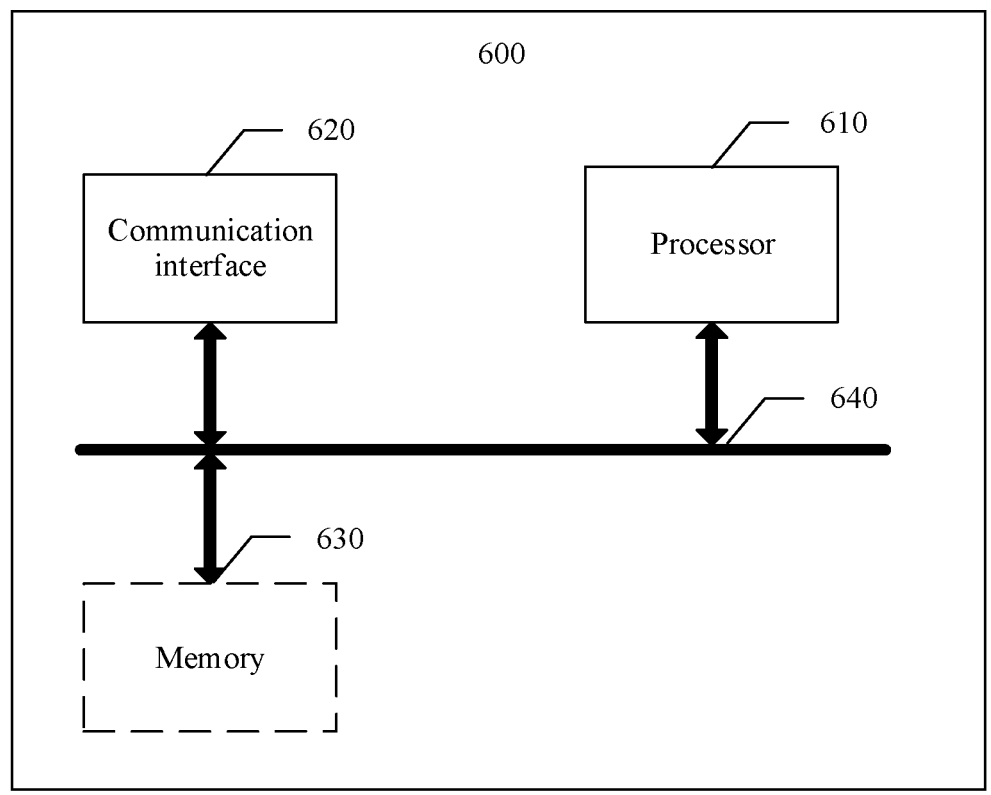
FIG. 6 is a schematic diagram of a structure of another communication apparatus according to an embodiment of this application.

Refer to FIG. 6. An embodiment of this application further provides a communication apparatus 600, configured to implement a function of the transmit end device or the receive end device in the foregoing method. The communication apparatus may be a terminal or a network device, an apparatus in a terminal or a network device, or an apparatus that can be used together with a terminal and a network device. The communication apparatus 600 may be a chip system. In this embodiment of this application, the chip system may include a chip, or may include a chip and another discrete component. The communication apparatus 600 includes at least one processor 610, configured to implement the functions of the terminal or the network device in the method provided in embodiments of this application. The communication apparatus 600 may further include a communication interface 620. In embodiments of this application, the communication interface may be a transceiver, a circuit, a bus, a module, or a communication interface of another type, and is configured to communicate with another device by using a transmission medium. For example, the communication interface 620 is used for an apparatus in the communication apparatus 600 to communicate with another device.

The processor 610 may perform the functions performed by the processing unit 510 in the communication apparatus 500. The communication interface 620 may be configured to perform the functions performed by the transceiver unit 520 in the communication apparatus 500.

When the communication apparatus 600 is configured to perform a method (for example, the method shown in FIG. 2) at the transmit end, the processor 610 is configured to obtain a first sequence and a common sequence group, where the first sequence includes K first sub-sequences. The processor is further configured to: separately map the K first sub-sequences into K second sub-sequences based on the common sequence group. The communication interface 620 is configured to output a second sequence, where the second sequence includes the K second sub-sequences.

When the communication apparatus 600 is configured to perform a method (for example, the method shown in FIG. 4) at the receive end, the communication interface 620 is configured to receive a second sequence, where the second sequence includes K second sub-sequences. The processor 610 is configured to: separately map the K second sub-sequences into K first sub-sequences based on a common sequence group, and is further configured to determine a first sequence based on the K first sub-sequences.

The communication interface 620 is further configured to perform other receiving or sending steps or operations related to the method of the transmit end or the receive end in the foregoing method embodiments. The processor 610 may be further configured to perform other corresponding steps or operations other than receiving and sending in the foregoing method embodiments. Details are not described herein again.

The communication apparatus 600 may further include at least one memory 630, configured to store program instructions and/or data. The memory 630 is coupled to the processor 610. The coupling in this embodiment of this application may be an indirect coupling or a communication connection between apparatuses, units, or modules in an electrical form, a mechanical form, or another form, and is used for information exchange between the apparatuses, the units, or the modules. The processor 610 may operate in collaboration with the memory 630. The processor 610 may execute the program instructions stored in the memory 630. In a possible implementation, at least one of the at least one memory may be integrated with the processor. In another possible implementation, the memory 630 is located outside the communication apparatus 600.

In this embodiment of this application, a specific connection medium between the communication interface 620, the processor 610 and the memory 630 is not limited. In this embodiment of this application, the memory 630, the processor 610, and the communication interface 620 are connected through a bus 640 in FIG. 6, and the bus 640 is represented by using a bold line in FIG. 6. A connection manner between other components is merely an example for description, and is not limited thereto. The bus may be categorized as an address bus, a data bus, a control bus, or the like. For ease of representation, only one thick line is used to represent the bus in FIG. 6, but this does not mean that there is only one bus or only one type of bus.

In this embodiment of this application, the processor 610 may be a baseband processor. For example, at the transmit end, the processor 610 determines K second sub-sequences by using any possible implementation in the foregoing method embodiments, and outputs, to a radio frequency circuit by using the communication interface 620, a second sequence (baseband signal) including the K second sub-sequences. The radio frequency circuit performs radio frequency processing on the baseband signal, and then sends the radio frequency signal to the outside in a form of an electromagnetic wave by using an antenna. For example, at the receive end, a radio frequency circuit receives a radio frequency signal by using an antenna, and converts the radio frequency signal into a baseband signal (a second sequence). The communication interface 620 obtains a second sequence, where the second sequence includes K second sub-sequences. The processor 610 restores the first sequence based on the received K second sub-sequences by using any possible implementation in the foregoing method embodiment.

It should be noted that the processor 610 may be one or more central processing units (CPU). When the processor 610 is one CPU, the CPU may be a single-core CPU, or may be a multi-core CPU. The processor 610 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 630 may include but is not limited to a nonvolatile memory, for example, a hard disk drive (HDD) or a solid-state drive (SSD), a random access memory (RAM), an erasable programmable read-only memory (EPROM), a read-only memory (ROM), or a compact disc read-only memory (CD-ROM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

Figure 7:
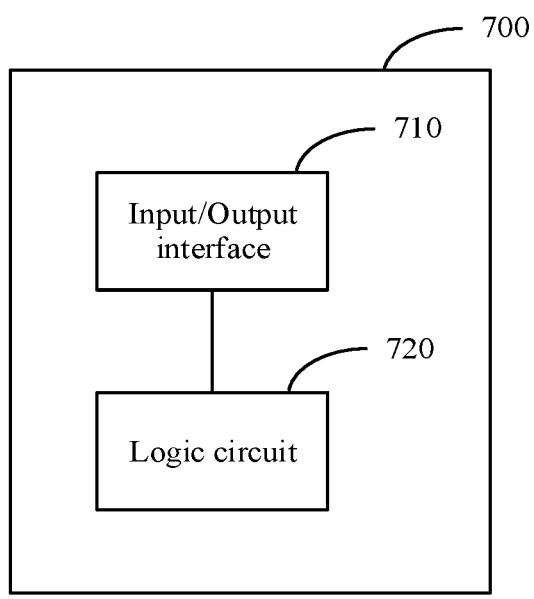
FIG. 7 is a schematic diagram of a structure of still another communication apparatus according to an embodiment of this application.

As shown in to FIG. 7, an embodiment of this application further provides an apparatus 700, configured to implement functions of the transmit end device or the receive end device in the foregoing methods. The apparatus 700 may be a communication apparatus or a chip in a communication apparatus. The communication apparatus includes:

at least one input/output interface 710 and a logic circuit 720. The input/output interface 710 may be an input/output circuit. The logic circuit 720 may be a signal processor, a chip, or another integrated circuit that can implement the methods in this application.

The at least one input/output interface 710 is configured to input or output a signal or data. For example, when the apparatus is a transmit end device or is used for a transmit end device, the input/output interface 710 is configured to output a second sequence, where the second sequence includes K second sub-sequences. For example, when the apparatus is a receive end device or is used for a receive end device, the input/output interface 710 is configured to receive a second sequence, where the second sequence includes K second sub-sequences.

The logic circuit 720 is configured to perform a part or all of the steps in any one of the methods provided in embodiments of this application. The logic circuit may implement the functions implemented by the processing unit 510 in the apparatus 500 and the processor 610 in the apparatus 600. For example, when the apparatus is a transmit end device or is used for a transmit end device, the apparatus is configured to perform various steps in the foregoing method embodiment of the transmit end. For example, the logic circuit 720 is configured to obtain a first sequence and a common sequence group, where the first sequence includes K first sub-sequences; and is further configured to separately map the K first sub-sequences into K second sub-sequences based on the common sequence group. When the apparatus is a receive end device or is used for a receive end device, the apparatus is configured to perform the steps performed by the transmit end device in the possible implementation methods in the foregoing receive end method embodiments. For example, the logic circuit 720 is configured to map K second sub-sequences into K first sub-sequences based on a common sequence group; and is further configured to determine a first sequence based on the K first sub-sequences.

Based on a same concept as the foregoing method embodiments, an embodiment of this application further provides a computer-readable storage medium. The computer-readable storage medium stores a computer program. The computer program is executed by hardware (for example, a processor), to implement a part or all of the steps in any one of the methods performed by any apparatus in embodiments of this application.

Based on a same concept as the foregoing method embodiments, an embodiment of this application further provides a computer program product including instructions. When the computer program product runs on a computer, the computer is enabled to perform a part or all of the steps in any one of the methods in the foregoing aspects.

Based on a same concept as the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement an operation performed by the transmit end device or the receive end device in any one of the foregoing method embodiments and the possible implementations of the method embodiments. The chip system may include the chip, or may include the chip and another discrete component, such as a memory (or a storage module) and/or a transceiver (or a communication module).

Based on a same concept as the foregoing method embodiment, this application further provides a communication system. The communication system may include the foregoing transmit end device and the foregoing receive end device. The transmit end device may be a terminal or a network device, and the receive end device may be a terminal or a network device. The communication system may be configured to implement an operation performed by the transmit end device or the receive end device in any one of the foregoing method embodiments or the possible implementations of the method embodiments. For example, the communication system may have the structure shown in FIG. 1.

A part or all of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or other programmable apparatuses. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the description of each embodiment has respective focuses. For a part that is not described in detail in an embodiment, refer to related descriptions in other embodiments.

In the foregoing embodiments, the description of each embodiment has respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of embodiments.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application.

The foregoing description is merely some specific implementations of this application, but is not intended to limit the protection scope of this application. Any person skilled in the art may make changes and modifications to these embodiments within the technical scope disclosed in this application. Therefore, the following claims are intended to be construed as to cover the foregoing embodiments and to indicate changes and modifications falling within the scope of this application. Therefore, the protection scope of this application shall be subject to the protection scope of the claims.

What is claimed is:

1. A data transmission method, comprising:
obtaining a first sequence and a common sequence group, wherein a quantity of sequences in the common sequence group is N;
the first sequence comprises K first sub-sequences, and lengths of the K first sub-sequences are sequentially $B_1$, $B_2$, . . . , and $B_K$, wherein K is a positive integer, $B_1=\log_2 N$, and a length $B_1$ of a $1^{st}$ first sub-sequence is greater than or equal to a length of another first sub-sequence in K first sub-sequences;
separately mapping the K first sub-sequences into K second sub-sequences based on the common sequence group; and
outputting a second sequence, wherein the second sequence comprises the K second sub-sequences.

2. The method according to claim 1, wherein all or a part of the K first sub-sequences comprise a check bit.

3. The method according to claim 1, wherein the separately mapping the K first sub-sequences into K second sub-sequences based on the common sequence group comprises:
selecting, from the common sequence group based on values of $1^{st}$ to $n^{th}$ first sub-sequences, an $n^{th}$ second sub-sequence corresponding to the $n^{th}$ first sub-sequence, wherein n is an integer greater than or equal to 2 and less than or equal to K.

4. The method according to claim 3, wherein:
the $n^{th}$ first sub-sequence corresponds to an $n^{th}$ sequence subgroup that comprises $2^{\wedge}B_n$ sequences in the common sequence group, and the $n^{th}$ second sub-sequence is a sequence in the $n^{th}$ sequence subgroup;
the $n^{th}$ sequence subgroup is determined based on values of the $1^{st}$ to $(n-1)^{th}$ first sub-sequences; and
the $n^{th}$ second sub-sequence is obtained by selecting a value of the $n^{th}$ first sub-sequence from the $n^{th}$ sequence subgroup.

5. The method according to claim 3, wherein:
the $n^{th}$ second sub-sequence is selected from the $n^{th}$ sequence subgroup based on a value of the $n^{th}$ first sub-sequence;
the $n^{th}$ sequence subgroup is obtained by sequentially sorting $f(0)^{th}, f(1)^{th}, \ldots, f(2^{\wedge}(B_n)-1)^{th}$ sequences in the common sequence group; and
$f(\ )$ satisfies a condition of $f(c(i))=c(mod((i+1), N))$, wherein $c(i)=mod(b*i*(i+1)/2, N)$ and $i=0, 1, \ldots, N-1$; $b=mod(a, N/2)*2+1$, wherein the parameter a is determined based on values of the $1^{st}$ to $(n-1)^{th}$ first sub-sequences.

6. The method according to claim 5, wherein:
the $n^{th}$ second sub-sequence is a sequence whose sequence number is equal to a value of the $n^{th}$ first sub-sequence in the $n^{th}$ sequence subgroup.

7. The method according to claim 5, wherein:
the parameter a is a sum of values of the $1^{st}$ to $(n-1)^{th}$ first sub-sequences;
the parameter a is a product of values of the $1^{st}$ to $(n-1)^{th}$ first sub-sequences; or
the parameter a is obtained by performing a further operation on a product of values of the $1^{st}$ to $(n-1)^{th}$ first sub-sequences.

8. The method according to claim 3, further comprising:
the $n^{th}$ second sub-sequence is selected from the $n^{th}$ sequence subgroup based on a value of the $n^{th}$ first sub-sequence; and
the $n^{th}$ sequence subgroup is obtained by sequentially sorting $mod(a+i, N)^{th}$ sequences in the common sequence group, wherein $i=0, 1, \ldots, 2^{\wedge}(B_n)-1$, and the parameter a is determined based on values of the $1^{st}$ to $(n-1)^{th}$ first sub-sequences.

9. The method according to claim 3, further comprising:
the $n^{th}$ second sub-sequence is selected from the $n^{th}$ sequence subgroup based on a value of the $n^{th}$ first sub-sequence;
the $n^{th}$ sequence subgroup is obtained by sequentially sorting $f(0)^{th}, f(1)^{th}, \ldots, f(2^{\wedge}(B_n)-1)^{th}$ sequences in the common sequence group; and
$f(\ )$ meets-satisfies a condition of $f(i)=mod(((1-a^{\wedge}i)*b)/(1-a), N), i=0, 2, \ldots, N-1$, and the parameter a and the parameter b are determined based on values of the $1^{st}$ to $(n-1)^{th}$ first sub-sequences.

10. The method according to claim 9, wherein:
the parameter b is a sum of values of the $1^{st}$ to $(n-1)^{th}$ first sub-sequences;
the parameter b is a product of values of the $1^{st}$ to $(n-1)^{th}$ first sub-sequences; or
the parameter b is obtained by performing a further operation on a product of values of the $1^{st}$ to $(n-1)^{th}$ first sub-sequences.

11. The method according to claim 1, wherein the common sequence group is a preconfigured sequence group.

12. The method according to claim 1, wherein the method further comprises: before outputting the second sequence, truncating a part of the K second sub-sequences.

13. A communication apparatus, comprising:
at least one processor coupled to at least one memory storing a computer program, which when executed by the at least one processor, cause the communication apparatus to:
obtain a first sequence and a common sequence group, wherein a quantity of sequences in the common sequence group is N;
the first sequence comprises K first sub-sequences, and lengths of the K first sub-sequences are sequentially $B_1$, $B_2$, ..., and $B_K$, wherein K is a positive integer, $B_1=\log_2 N$, and a length Bi of a $1^{st}$ first sub-sequence is greater than or equal to a length of another first sub-sequence in the K first sub-sequences;
separately map the K first sub-sequences into K second sub-sequences based on the common sequence group; and
output a second sequence, wherein the second sequence comprises the K second sub-sequences.

14. The communication apparatus according to claim 13, wherein all or a part of the K first sub-sequences comprise a check bit.

15. The communication apparatus according to claim 13, wherein when the computer programs-is executed by the at least one processor, cause the communication apparatus to:
select, from the common sequence group based on values of $1^{st}$ to $n^{th}$ first sub-sequences, an $n^{th}$ second sub-sequence corresponding to the $n^{th}$ first sub-sequence, wherein n is an integer greater than or equal to 2 and less than or equal to K.

16. The communication apparatus according to claim 15, wherein:
the $n^{th}$ first sub-sequence corresponds to an $n^{th}$ sequence subgroup that comprises $2^{\wedge}B_n$ sequences in the common sequence group, and the $n^{th}$ second sub-sequence is a sequence in the $n^{th}$ sequence subgroup;
the $n^{th}$ sequence subgroup is determined based on values of the $1^{st}$ to $(n-1)^{th}$ first sub-sequences; and
the $n^{th}$ second sub-sequence is obtained by selecting a value of the $n^{th}$ first sub-sequence from the $n^{th}$ sequence subgroup.

17. The communication apparatus according to claim 15, wherein:
the $n^{th}$ second sub-sequence is selected from the $n^{th}$ sequence subgroup based on a value of the $n^{th}$ first sub-sequence;
the $n^{th}$ sequence subgroup is obtained by sequentially sorting $f(0)^{th}, f(1)^{th}, \ldots, f(2^{\wedge}(B_n)-1)^{th}$ sequences in the common sequence group; and
$f(\ )$ satisfies a condition $f(c(i))=c (mod((i+1), N))$, wherein $c(i)=mod(b*i*(i+1)/2, N)$ and $i=0, 1, \ldots, N-1$; $b=mod(a, N/2)*2+1$, wherein the parameter a is determined based on values of the $1^{st}$ to $(n-1)^{th}$ first sub-sequences.

18. The communication apparatus according to claim 15, wherein;
- the $n^{th}$ second sub-sequence is selected from the $n^{th}$ sequence subgroup based on a value of the $n^{th}$ first sub-sequence; and
- the $n^{th}$ sequence subgroup is obtained by sequentially sorting mod(a+i, N)$^{th}$ sequences in the common sequence group, wherein i=0, 1, . . . , $2^{\wedge}(B_n)-1$, and the parameter a is determined based on values of the $1^{st}$ to $(n-1)^{th}$ first sub-sequences.

19. The communication apparatus according to claim 15, wherein:
- the $n^{th}$ second sub-sequence is selected from the $n^{th}$ sequence subgroup based on a value of the $n^{th}$ first sub-sequence;
- the $n^{th}$ sequence subgroup is obtained by sequentially sorting f(0)$^{th}$, f(1)$^{th}$, . . . , f($2^{\wedge}(B_n)-1$)th sequences in the common sequence group; and
- f( ) meets-satisfies a condition of f(i)=mod(((1-a$^{\wedge}$i)* b)/(1-a), N), i=0, 2, . . . , N-1, and the parameter a and the parameter b are determined based on values of the $1^{st}$ to $(n-1)^{th}$ first sub-sequences.

20. The communication apparatus according to claim 13, wherein when the computer programs is executed by the at least one processor, further cause the communication apparatus to truncate, before output the second sequence, a part of the K second sub-sequences.

\* \* \* \* \*